(12) United States Patent
Krauss et al.

(10) Patent No.: US 6,722,697 B2
(45) Date of Patent: Apr. 20, 2004

(54) ASSEMBLY OF SEAT BELT BUCKLE AND BELT TIGHTENER

(75) Inventors: Walter Krauss, München (DE); Stephan Schwald, Hersching (DE); Thomas Schrott, Feldafing (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 277 days.

(21) Appl. No.: 09/972,614

(22) Filed: Oct. 8, 2001

(65) Prior Publication Data

US 2002/0109346 A1 Aug. 15, 2002

(30) Foreign Application Priority Data

Feb. 12, 2001 (DE) ........................ 201 02 416 u

(51) Int. Cl.$^7$ ............................................. B60R 22/46
(52) U.S. Cl. ..................................................... 280/806
(58) Field of Search ........................... 280/806; 297/480

(56) References Cited

U.S. PATENT DOCUMENTS

| | | | |
|---|---|---|---|
| 5,725,249 A | 3/1998 | Nishide et al. | 280/806 |
| 6,016,589 A | 1/2000 | Wier | 24/687 |
| 6,126,241 A | * 10/2000 | Wier | 280/806 |
| 6,213,513 B1 | * 4/2001 | Grabowski et al. | 280/806 |

FOREIGN PATENT DOCUMENTS

| | | |
|---|---|---|
| DE | 10009422 | 9/2001 |
| EP | 0685371 | 4/1995 |
| EP | 0685372 | 5/1995 |
| EP | 0869041 | 3/1998 |
| EP | 1072484 | 7/2000 |
| EP | 1231117 | 2/2002 |

* cited by examiner

Primary Examiner—Eric Culbreth
(74) Attorney, Agent, or Firm—Lonnie Drayer; Jarett Rieger

(57) ABSTRACT

An assembly of seat belt buckle and a seat belt tightener has a seat belt buckle that is connected to a seat belt tightener by a pulling element. The pulling element is firmly connected within a buckle casing to a buckle mechanism of the belt buckle. The pulling element, in a region directly adjacent to the buckle casing is at least partly enclosed by a cover. The cover has an exterior shape that is tapered towards a direction in which the buckle is pulled during a seat belt tightening process. The external dimensions of the cover in the region of its larger cross section approximate the external dimensions of the adjacent end of the buckle casing and in the external dimensions of the cover in the region of its smaller cross section approximate to the external dimensions of the pulling element. Put another way, the taper of the cover approximates a taper defined by the external dimensions of an adjacent end of the buckle casing and the external dimensions of the cable over the length of the cover.

4 Claims, 4 Drawing Sheets

ASSEMBLY OF SEAT BELT BUCKLE AND BELT TIGHTENER

FIELD OF THE INVENTION

The present invention relates to an assembly of a seat belt buckle and a seat belt tightener.

DISCUSSION OF THE PRIOR ART

EP0 685 371 B1 teaches a seat belt buckle for a front seat of a motor vehicle that is positioned between the central console and the front seat. The distance between the central console and the closest surface of the seat is in many cases relatively small. Only a narrow gap is provided between the central console and a seat, or between two seat cushions, into which the seat belt buckle can be withdrawn by a belt tightener. The front seats can be longitudinally adjusted by up to 330 mm which may further narrow said gap. During the belt tightening process the buckle casing may become lodged in said gap. This undesirable trapping of the belt buckle arises in particular due to a transverse motion that occurs momentarily due to the mass inertia of the buckle being accelerated during the belt tightening process. Movements of a vehicle occupant wearing the seat belt, in particular in the upper leg region, over which the pelvic belt is drawn during the belt tightening process, can also cause the belt buckle to become lodged in the gap between the central console and a seat.

SUMMARY OF THE INVENTION

There is provided in accordance with the present invention an assembly of a seat belt buckle and a seat belt tightener comprising a belt buckle connected to a seat belt tightener by a pulling elements. The pulling element being firmly connected to the seat belt buckle. In a region directly adjacent to the buckle casing, the pulling element is at least partly enclosed by a cover having an exterior shape that is tapered towards the direction in which the buckle is pulled during a seat belt tightening process. The external dimensions of the cover in the region of its larger cross section approximate the external dimensions of an adjacent end of the buckle casing and the external dimensions of the cover in the region of its smaller cross section approximate the external dimensions of the pulling element. Put another way, the taper of the cover approximates a taper defined by the external dimensions of an adjacent end of the buckle casing and the external dimensions of the cable over the length of the cover.

DETAILED DESCRIPTION OF THE INVENTION

Figure 1:
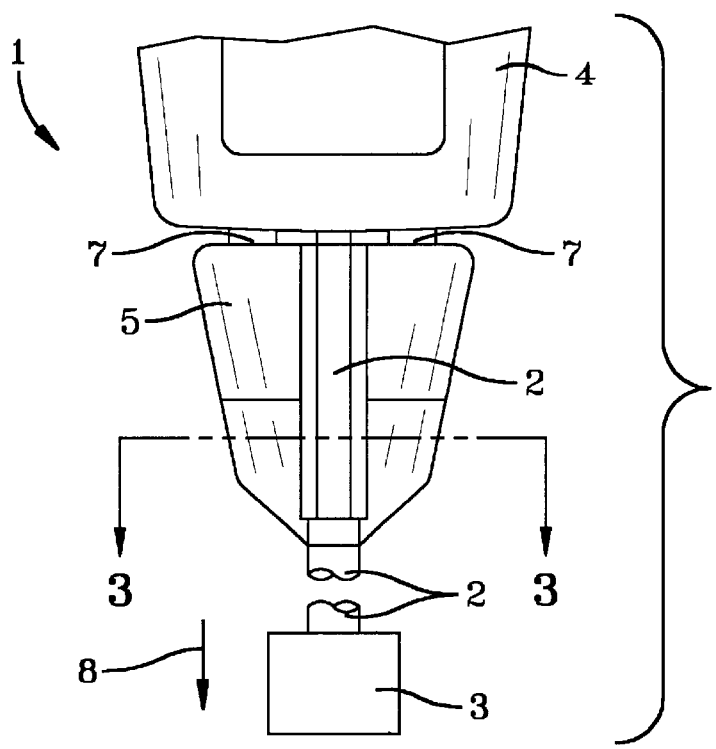
FIG. 1 is a side view of a first embodiment of an assembly of seat belt buckle and a seat belt tightener.
Figure 2:
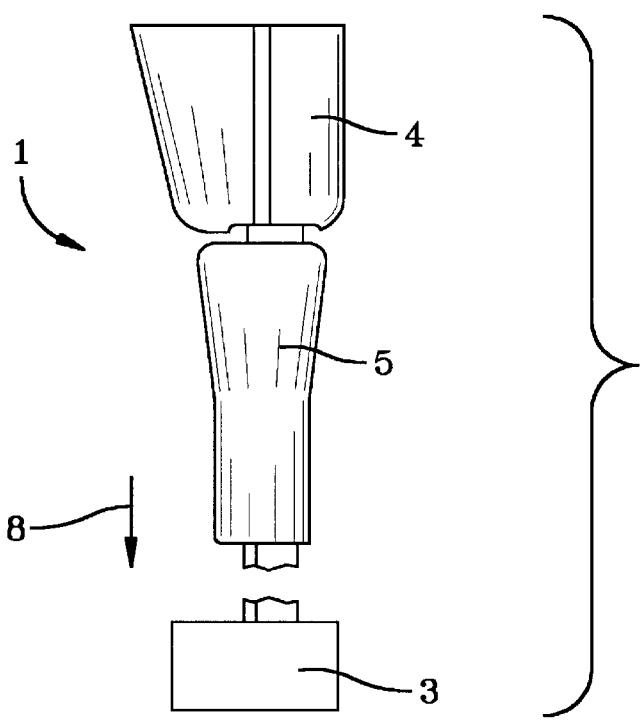
FIG. 2 is a front view of the embodiment shown in FIG. 1.
Figure 3:
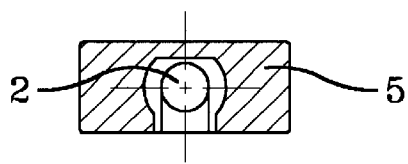
FIG. 3 is a sectional view along section line 3—3 in FIG. 1.
Figure 6:
FIG. 6 is a sectional view along section line 6—6 in FIG. 4.
Figure 7:
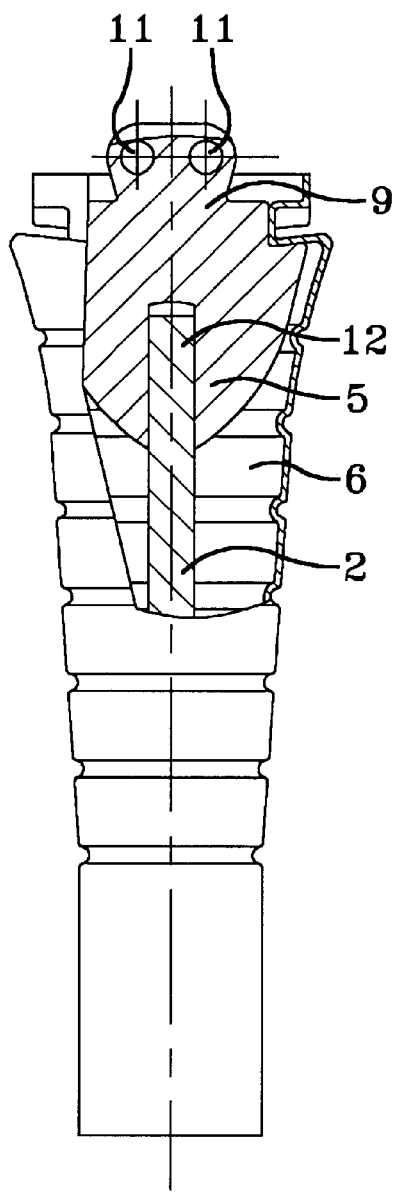
FIG. 7 is a side view, partially broken away, of a third embodiment of an assembly of seat belt buckle and a seat belt tightener.
Figure 8:
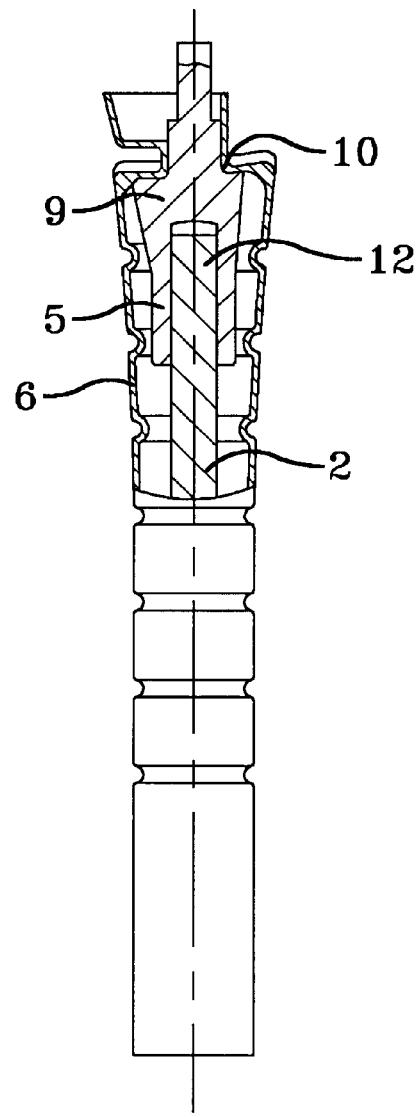
FIG. 8 is a front view, partially broken away, of the embodiment shown in FIG. 7.

The figures show embodiments of assemblies of seat belt buckles and seat belt tighteners. In each embodiment a seat belt buckle 1 has a buckle casing 4 that encloses a known buckle mechanism (not shown) designed to engage a buckle tongue (not shown) in a known manner, wherein the buckle tongue is attached to a seat belt (not shown) in a known manner. A first end of at least one pulling element 2 is connected to the buckle mechanism. In the embodiment of FIGS. 1 to 3 the pulling element is a single cable and in the embodiment of FIGS. 4 to 6 the pulling element is a double cable. In the embodiment of FIGS. 7 and 8, the pulling element 2 is also a single cable.

A second end of the pulling element 2 is connected to a seat belt tightener 3. Any suitable seat belt tightener, such at that taught in EP 0 685 371 B1, which is incorporated herein by reference, may be used in the practice of the present invention. The seat belt buckle 1 can be pulled by the seat belt tightener in a seat belt tightening direction 8, that is to say the direction in which the buckle is pulled during a seat belt tightening process. This results in tightening in a known manner a seat belt (not shown) that is connected to the seat belt buckle 1 via a buckle tongue (not shown).

In a region directly adjacent to the lower end of the buckle casing 4, the pulling element 2 is enclosed by a cover 5 made of a solid material, for instance plastic. As used herein terms such as "lower", "upper", "above", "below", "left", "right" and the like are understood to be used in the context of the orientation of the assemblies depicted in the drawing figures that accompany this text. The cover 5 is preferably fastened to the pulling element 2 and can extend into the buckle casing 4 for an improved position fixing. The cover 5 can completely or partly enclose the pulling element 2. The cover 5 has an exterior shape that is tapered towards the direction 8 that the seat belt tightener 3 pulls the seat belt buckle during the belt tightening process. In the region of its larger cross section, the external dimensions of the cover 5 approximate the external dimensions of the next adjacent end of the buckle casing 4. In the region of its smaller cross section, the external dimensions of the cover 5 approximate the external dimensions of the pulling element 2. This creates a smooth transitional contour between the pulling element 2 and the lower end of the buckle casing 4. That is to say, the taper of the cover approximates a taper defined by the external dimensions of an adjacent end of the buckle casing and the external dimensions of the pulling element over the length of the cover. As used herein and in the claims, the dimensions of one component approximate the dimensions of another component when the dimensions of the two components are similar but not the same, or from one end of a first component to the other the dimensions are in the same general relationship as the corresponding dimensions of the related components are to one another.

The cover 5 ensures that during the tightening of the seat belt, i.e. during the movement of the seat belt buckle 1 in the direction 8 in which the buckle is pulled during a seat belt tightening process. Said movement can be carried out unhindered in a narrow gap, in particular between a central console of a vehicle and the adjacent vehicle seat or during the tightening in the rear seats or rear bench seats of the vehicle.

Figure 4:
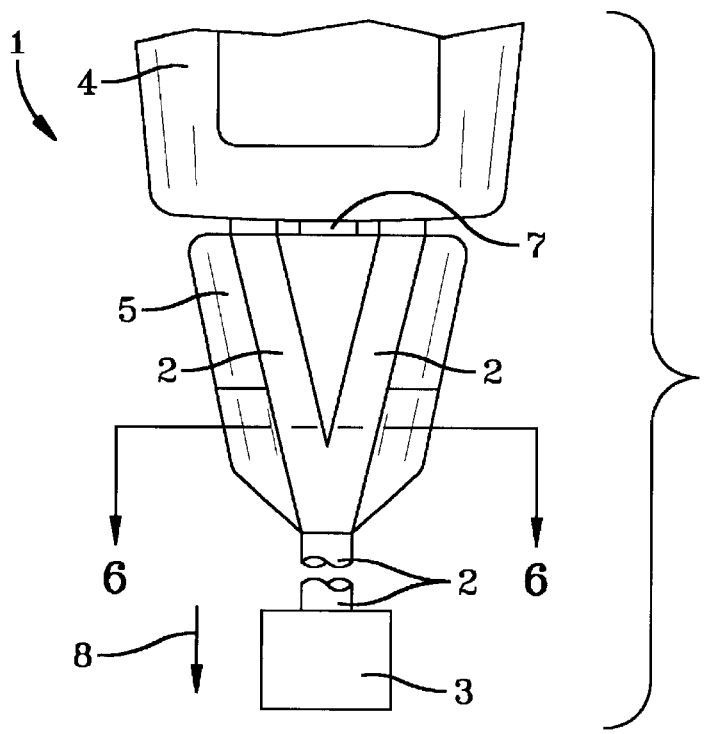
FIG. 4 is a side view of a second embodiment of an assembly of seat belt buckle and a seat belt tightener.
Figure 5:
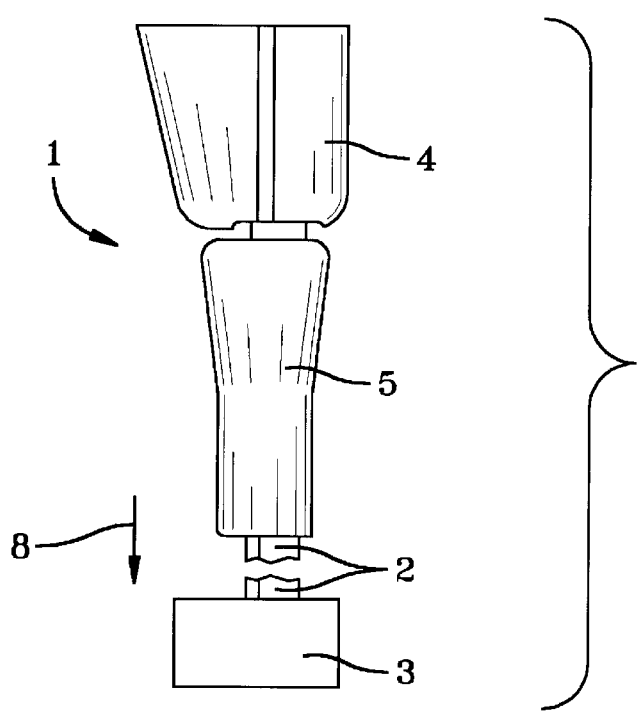
FIG. 5 is a front view of the embodiment shown in FIG. 4.

Preferably, to fix the position of the cover 5, at least one projection 7 can be arranged on the cover, extending into the interior of the buckle casing 4, as shown in FIGS. 4 and 5. It is also possible, however, to more than one, for instance two, projections 7 on the cover as shown in FIGS. 1 and 2.

In the embodiment shown in FIGS. 7 and 8, the cover 5 is located in an expansion bellows 6, which essentially covers the total length of the pulling element 2. In this embodiment, the cover 5 is formed as one piece with a pulling element 9, and the pulling element 2, which is a single cable, is anchored to the buckle mechanism (not shown), in particular to a buckle plate. Rivets inserted into fastening orifices 11, fasten the pulling element anchor 9 to the buckle mechanism. The pulling element 2, which is preferably a cable with a traction strand, is firmly connected 12 to the pulling element anchor 9 in a clamping or crimping manner. In FIGS. 7 and 8 the cover 5 is formed on the pulling element anchor 9, which extends into the buckle casing (not further represented). The cover 5 comprises the same material as the pulling element anchor 9, in particular a metal or metal alloy.

Figure 11:
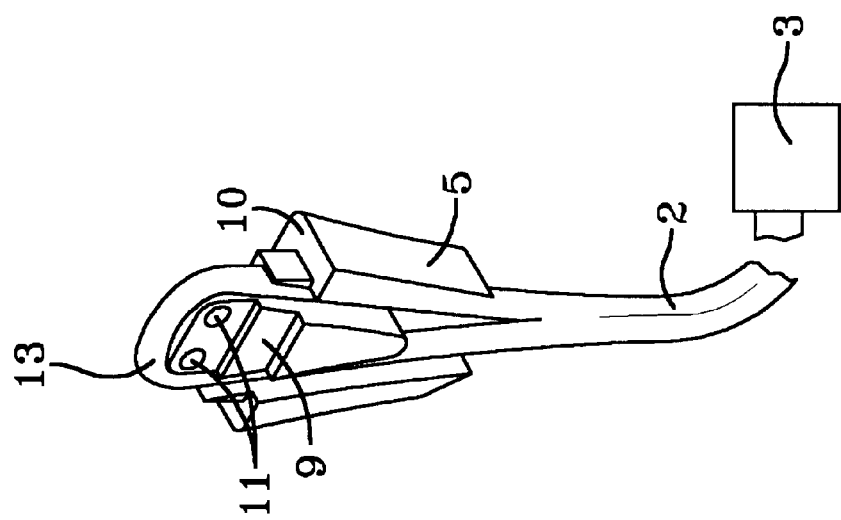
FIG. 11 is a perspective view of the embodiment shown in FIGS. 9 and 10.
Figure 10:
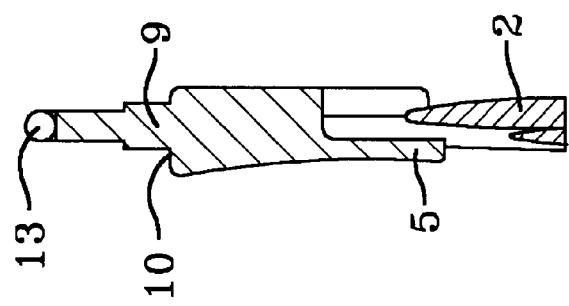
FIG. 10 is a sectional view of the embodiment shown in FIG. 9 along section line 10—10.
Figure 9:
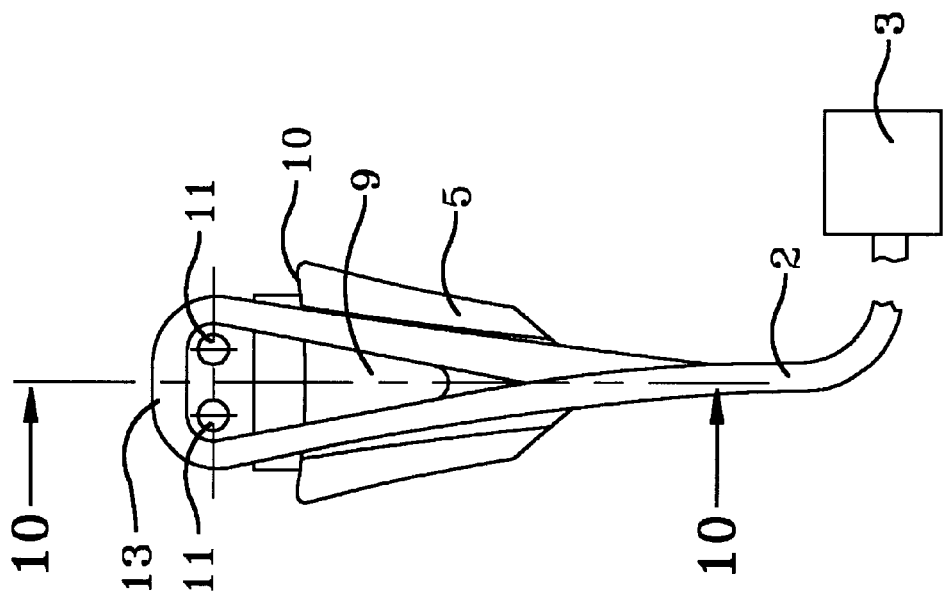
FIG. 9 is a side view of a further embodiment of an assembly of seat belt buckle and a seat belt tightener.

In the embodiment shown in FIGS. 9 to 11, the cover 5 is formed as one piece with the pulling element anchor 9. The pulling element 2 is preferably a cable, preferably formed of two strands, that is wrapped around the approximately V-shaped pulling element anchor 9 via a cable loop 13. Rivets inserted into fastening orifices 11 fasten the pulling element anchor 9 to the buckle mechanism.

A collar 10 is formed on the cover 5 to support the expansion bellows shown in FIGS. 7 and 8. The lower end (not further represented) of the buckle casing 4 is located above the collar 10 and close to the collar.

During the seat belt tightening process in a crash the belt buckle is prevented from being lodged in the narrow gap between the central console and a the vehicle seat, or between a pair of adjoining seat cushions. The buckle cover 5 functions as a guide element, ensuring that during the seat belt tightening process the belt buckle is guided without hindrance even through a narrow passage. The buckle cover provides a smooth transitional contour between the pulling element and the front end of the buckle casing 4 as viewed during the tightening of the seat belt. The pulling element 2 can be a single or double cable that is fastened to the buckle mechanism in the buckle casing.

Many changes and modifications in the above described embodiments of the invention can, of course, be carried out without departing from the scope thereof. Accordingly, that scope is intended to be limited only by the scope of the appended claims.

We claim:

1. An assembly of a scat belt buckle and a seat belt tightener comprising a seat belt buckle connected to a seat belt tightener by a pulling element, the pulling element being a cable having a generally v-shape between the seat belt buckle and the scat belt tightener, and a cover having an exterior shape that is tapered towards a direction in which the buckle is pulled during a seat belt tightening process, the cover partially enclosing the pulling element, the external dimensions of the cover in a region of a larger cross section approximating the external dimensions of an adjacent end of a buckle casing and the cover in a region of a smaller cross section approximating external dimensions of the pulling element, whereby the pulling element splits into two strands in a region closer to the region of the smaller cross section than the region of the larger cross section, whereby the pulling element begins to split into two strands in a location adjacent to the cover, whereby each of an outer side surface of the cover from one end to an opposite end has a flat shape, wherein the outer side surfaces of the cover are surfaces that are substantially parallel with the pulling element.

2. The assembly of a seat belt buckle and a seat belt tightener according to claim 1 wherein die cover is attached to the pulling element.

3. An assembly of seat belt buckle and a seat belt tightener comprising a seat belt buckle connected to a seat belt tightener by a pulling element, the pulling element being a cable having a generally v-shape between the seat belt buckle and the seat belt tightener, and a cover having an exterior shape that is tapered towards a direction in which the buckle is pulled during a seat belt tightening process, the cover partially enclosing the pulling element, the taper of the cover approximately a taper defined by the external dimensions of an adjacent end of a buckle casing and the external dimensions of the pulling element over the length of the cover, whereby the pulling element splits into two strands in a region closer to a region of the smaller cross section that a region of the larger cross section whereby the pulling element begins to split into two strands in a location adjacent to the cover, whereby each of an outer side surface of the cover from one end to an opposite end has a flat shape, wherein the outer side surfaces of the cover are surfaces that are substantially parallel with the pulling element.

4. The assembly of a seat belt buckle and a seat belt tightener according to claim 3 wherein the cover is attached to the pulling element.

* * * * *